Sept. 27, 1938.　　　　S. BLOOMFIELD　　　　2,131,092
POTATO SLICER
Filed Nov. 3, 1936　　　　2 Sheets-Sheet 1
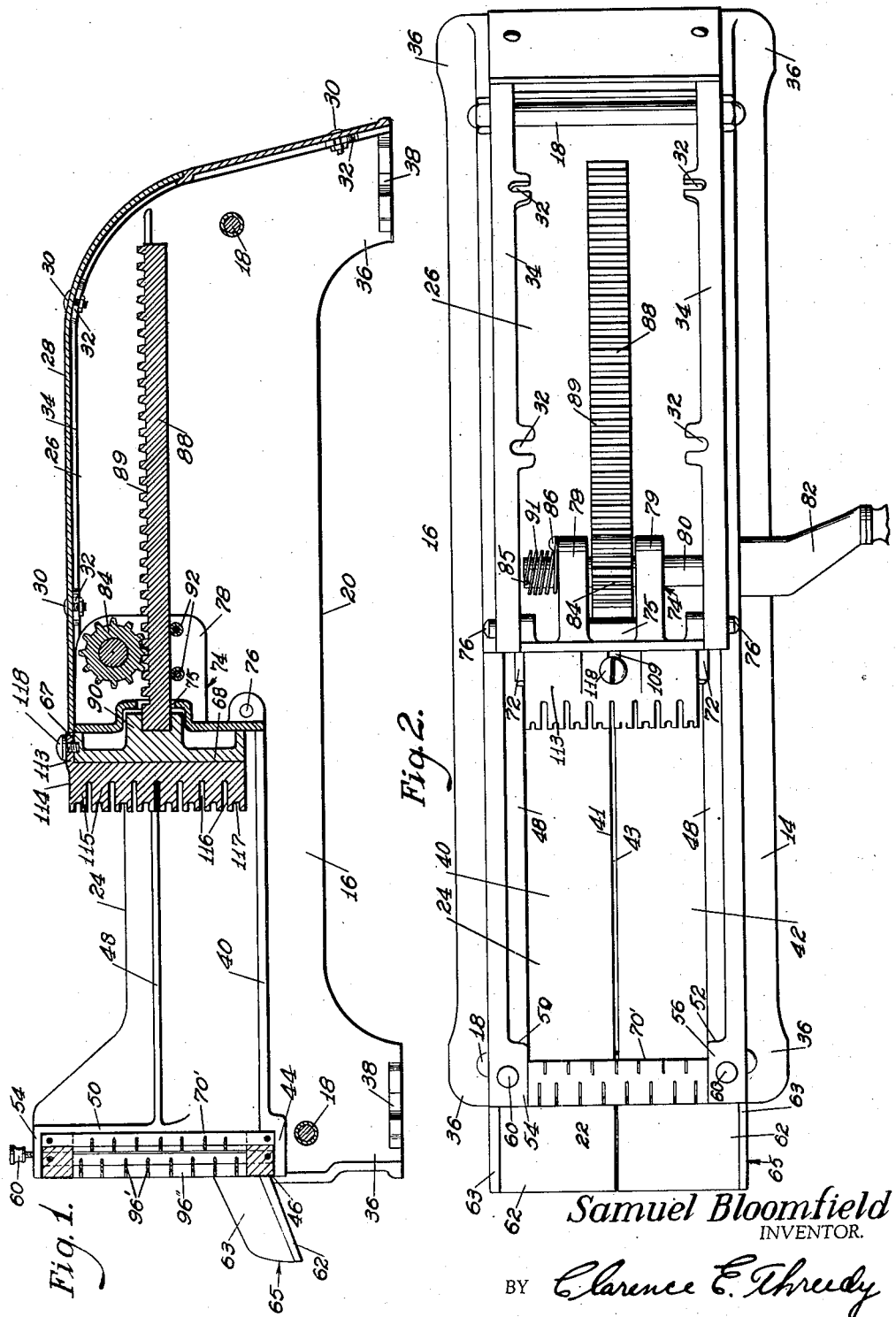
Samuel Bloomfield
INVENTOR.
BY Clarence E. Threedy
HIS ATTORNEY.

Sept. 27, 1938.　　　　　S. BLOOMFIELD　　　　　2,131,092
POTATO SLICER
Filed Nov. 3, 1936　　　　2 Sheets-Sheet 2
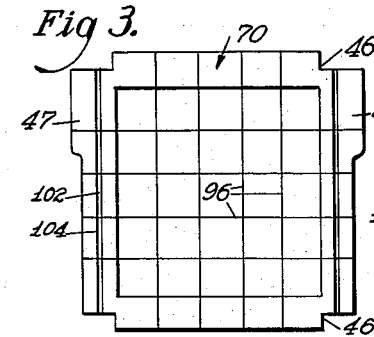
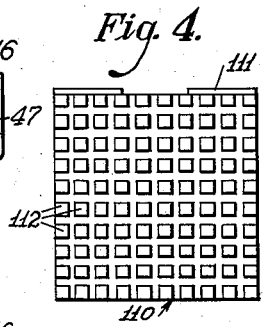
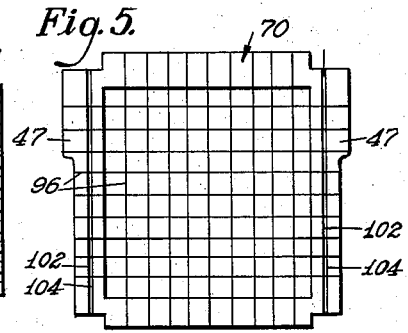
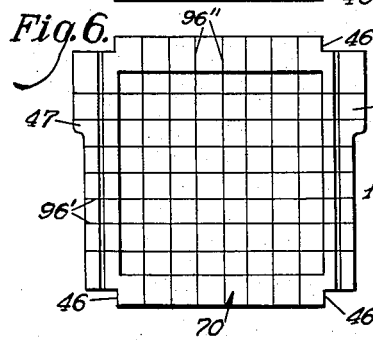
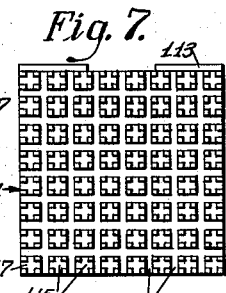
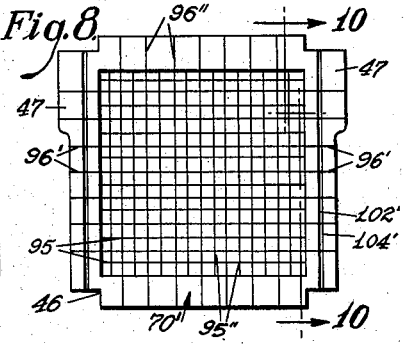
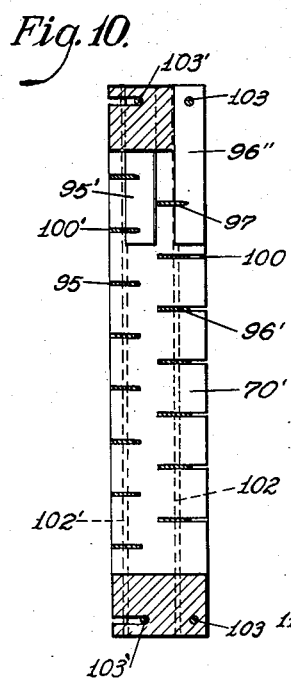
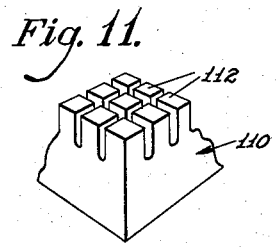
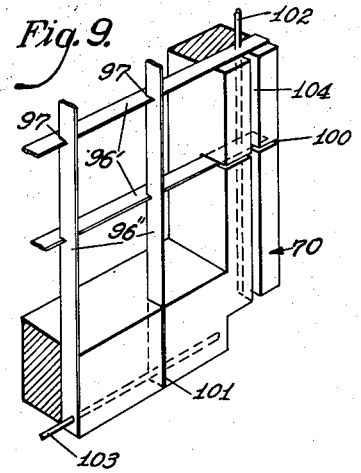
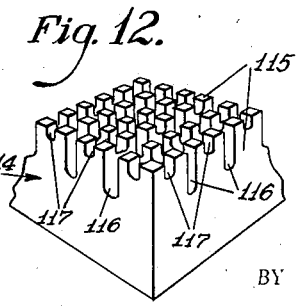
Samuel Bloomfield
INVENTOR.
BY Clarence E. Threedy
HIS ATTORNEY.

Patented Sept. 27, 1938

2,131,092

UNITED STATES PATENT OFFICE 2,131,092

POTATO SLICER

Samuel Bloomfield, Chicago, Ill.

Application November 3, 1936, Serial No. 108,996

4 Claims. (Cl. 146—169)

This invention relates to improvements in vegetable cutting machines and particularly provides an improved type of potato cutter which is simply and ruggedly constructed, readily operated, and easily cleaned.

A more particular object is the provision in such a device of improved cutting frames and means for mounting cutting members therein, together with removable cutting members adapted to interfit with the cutting members in the cutting frames.

A further object is the provision of a simple driving mechanism for the cutter head, and one which affords a maximum driving or cutting stroke with a minimum of exertion on the part of the user.

Other novel objects and features of construction and operation will appear in view of the following detailed description taken together with the drawings in which:

Fig. 1 is a median vertical section of the cutting machine;

Fig. 2 is a top plan view of the machine with a cover element removed;

Fig. 3 is a front elevation of a cutting frame and cutting members disposed therein in accordance with one desirable cutting formation;

Fig. 4 shows the pattern of one form of cutting head or die adapted to cooperate with the cutting frame of Fig. 3;

Fig. 5 is a front elevation of a cutting frame similar to that of Fig. 3, which includes additional cutting members arranged in a finer cutting pattern and which is also cooperable with the cutting die of Fig. 4;

Fig. 6 is a front elevation of a cutting frame similar to that of Fig. 5, in which the cutting members are arranged for a slightly coarser cutting pattern;

Fig. 7 is a front elevation of a cutting head or die adapted to cooperate with the cutting frame and pattern of cutters shown in Fig. 6;

Fig. 8 is another form of cutting frame in which the cutting members are disposed on both sides of the frame to give a finer cut, this frame being also cooperable with the cutting die of Fig. 7;

Fig. 9 is a fragmentary perspective view of a frame and mounting means for cutting members of the type corresponding to the frames of Figs. 3, 5, and 6;

Fig. 10 is a vertical section along the lines 10—10 of Fig. 8;

Fig. 11 is a fragmentary perspective of the cutting die or head of Fig. 4; while Fig. 12 is a fragmentary perspective of the cutting die of Fig. 7.

Referring to Fig. 2, my improved cutting machine shown in vertical section therein includes a housing or support divisible into two complementary sections 14 and 16, secured together by a plurality of transverse bolts 18.

The housing has a generally open bottom region 20, an open end wall 22, and two open top portions 24 and 26, the latter of which is adapted to be closed by a curvilinear closure plate 28 which fits upon the curved end wall portion of the housing opposite to the open end wall 22 by means of screws 30, which fit into mounting slots 32 provided in a pair of oppositely disposed and horizontally extended mounting flanges 34, which are extended laterally and inwardly from their respective side wall sections or portions 14 and 16.

The housing sections have suitably flared bottom or foot portions 36 in which are provided apertures 38 for the reception of mounting screws and the like, and each section 14 and 16 is also provided with a relatively wide table flange 40 and 42 which extends in a horizontal plane from a point adjacent the open end wall 22 to a point about mid way of the housing adjacent the innermost extremity of the laterally extending mounting flanges 34. Each of these table flanges 40 and 42 extends laterally of its respective side wall section 16 or 14 a distance sufficient to permit its outermost longitudinal edge portion 41 or 43 to confront the corresponding edge portion of the oppositely disposed flange, as shown in Fig. 2, so as to provide a cutting table on which a potato or other vegetable may rest during the cutting operation.

Each of the flanges 40 and 42 terminates in the region of the open end wall part 22 in a ledge portion 44 which is adapted to receive the notched corner portion 46 of one of the cutting frames 70 or 70'.

Above each of the table flanges 40 and 42 are smaller track flanges 48 extended in substantially a parallel plane with that of the table flanges adjacent the upper edge portions of each of the side wall sections below the open top wall part 24.

Each of these track flanges 48 terminates in the region adjacent the open end wall 22 of the housing in vertically extending flange portions 50, 52 which, in turn, terminate in horizontally extended seating flanges 54 and 56, to provide a further seating base for the corner portions 46 of a cutting frame 70 or 70'. Threaded into the top portion of each of the seating flanges 54, 56 is a set screw 60, the lowermost end of which is adapted to bear against an underlying portion of the frame 70 or 70', securely seating the latter in the pocket or seat formed by the several flange portions 44, 50, 54, as shown in Fig. 1.

Each of the side wall sections 14, 16 may have, extended from the region adjacent the open end wall portion 22 thereof, an integrally formed chute member having a downwardly tilted bottom portion 62 and a side wall portion 63, the bottom part being extended from a point substantially on a level with the table flanges 40, 42 to form the chute generally indicated at 65 when the two side wall sections of the housing are in assembled relation.

A driving head in the form of a substantially rectangular plate member 68 is provided with oppositely disposed pairs of track flanges 72, each adapted to embrace one of the track flanges 48 for sliding movement thereover, so that the driving head 68 can be slidably reciprocated in the region above the cutting table.

Driving means for the driving head include a bracket 74 attached by means of screws 76 to each of the side wall sections 14 and 16 and provided with a pair of oppositely positioned bearing flanges 78, 79, through which is extended a spindle 80. A pinion 84 is keyed to the spindle 80 between the bearing portions 78, 79 and the bracket 74, and a return spring 91 embraces the extended portion of the spindle and has one end 85 inserted in a receiving opening in the shaft or spindle, and has its other end attached by means of a screw 86 to the bearing portions 78 of the bracket 74.

A rack bar 88 is secured to a centrally extended portion 90 of the driving head 68, and extends through a central opening 75 in the bracket 74 below the pinion 84, with its bottom portion resting upon a pair of rollers 92 extended between the bearing flanges 78 and 79 of the bracket 74, in such manner that the teeth 89 of the rack will be maintained in mesh with those of the pinion 84.

The detailed operation of the device described above will be pointed out particularly hereinafter, but it will be apparent that the rotation of the spindle 80 will urge the driving head 68 along the track flanges 48 toward the cutting frame 70' upon rotation of the handle 82.

The improved cutting frames which also form an important part of the present invention, are shown in the several figures, and particularly in Figs. 3 to 10. The frames 70 and 70' shown in these figures, are generally similar insofar as they are each in the form of substantially rectangular frames of metal, preferably, each having corner slots 46 and each having a flared portion 47 on opposite frame members adjacent neighboring corner slots 46.

In the type of frame disclosed in Fig. 3, a plurality of blades 96 are disposed in lattice effect between opposite sides of the frame member in lateral slots 100. As shown in Fig. 9, the bottommost blades 96' have their terminal portions seated in the slots 100 and are threaded upon an elongated pin 102 which rests in a longitudinal slot 104 in the opposite sides of the frame in which the sidewise flares 47 are disposed, while the topmost blades 96" have their end portions seated in slots 101 in adjacently disposed frame members and are threaded upon pins 103 passing through suitable apertures in such end portions. Each of the blades 96" is provided with a notch 97 at spaced intervals corresponding to the distance between adjacent lateral extending cutters 96', and adapted to interfit with the latter. In this manner it will be apparent that the lowermost blades 96' are secured in the frame by the overlying blades 96", which are in turn keyed into their respective slots 101 by pins 103.

The purpose of the open frame slots 104 in which pins 102 are seated is to facilitate the removal of the blade assembly as a unit, it being observed that the pins 103 are inserted into their respective frame members in what may be termed closed slots or openings, so that the corresponding blades 96" cannot be removed from their respective slots 101 without a removal or withdrawal of the pins 103 from the frame. However, when this latter withdrawal is effected, the assembly of cutters or knives may be withdrawn from the frame by lifting the lowermost blades outwardly so as to lift the pins 102 out of the pin slots 104. This feature is of considerable importance in the assembly of the cutting frames, in cleaning the several knives, and in effecting replacements.

The type of cutter assembly and frame shown in Fig. 5 is substantially a duplicate of that just described in view of Figs. 3 and 9, the only important difference being in the closer disposition of the several cutting members to provide a finer cut.

In the operation of the device, the vegetable or similar object to be cut is urged against one of the cutting frames 70' and through the several cutting members 96 thereof by means of the driving head 68 and a suitable cutting head or die attached thereto. In order to avoid waste and urge the entire vegetable substance through the cutting frame, it is necessary to have the cutting head suitably slotted or channeled to provide a plurality of protusions or bosses which will fit into the several interstices formed by the cutting members in the frames.

Such a cutting head is shown in Figs. 4 and 11 and comprises a substantially solid body member 110 having a plurality of uniformly spaced bosses 112 arranged in rectangularly disposed rows and formed by cutting a plurality of adjacent channels at right angles to one another in the body 110, the bosses 112 being substantially square in shape. The spacing of the channels which result in the several bosses is determined upon the corresponding spacing of the several cutting members 96, in such manner that these cutting members will uniformly fit into the channel portions between the bosses 112. For example, in Fig. 4 it will be observed that four of the bosses grouped about a central point will fit within a square determined by the latticing of the several cutting knives 96.

In Fig. 5 the number of cutting members has been multiplied to produce a cut of finer degree than that afforded by the structure of Fig. 3, and it will be observed that the spacing of the cutters in the frame of Fig. 5 is likewise proportioned to the spacing of the bosses 112 in the cutting head 110, so that the latter will likewise fit within the interstices of the frame of Fig. 5.

In order to produce a still finer cut suitable for cutting a potato into the so-called shoe string cut, I have provided a cutting head 114 in which the number of bosses 115 is greatly multiplied and in which the latter are arranged in a square array, each in groups of four about a central point, and each bounded by rectangularly extended channel portions 116 and 117 of alternately deep and shallow depth in the direction of both coordinate axes of the frame (see Fig. 12).

A cutting frame suitable for use with a cutting head 114 of the type shown in Fig. 7 is disclosed in Figs. 8 and 10. In order to multiply the number of cutters to produce the fine mesh or cut represented in Fig. 8, it is found desirable to mount these cutters from both sides of the frame as shown in Fig. 10.

The construction of the fine cut frame shown in Figs. 8 and 10 is substantially that shown in Fig. 9, the particular mounting means and disposition of the several cutting blades 96', 96'' on one (right-hand) side of the frame in Fig. 10 being substantially identical with the mounting means and disposition of the blades 95 and 95' and corresponding locking pins 102', 103' in closed channels (not indicated) and upon channels 104' respectively, on the opposite (left-hand) side of the frame, with this exception—that correspondingly directed blades on opposite sides of the frame are staggered or displaced relative to one another for the obvious purpose of exposing the active cutting surface of each of the cutting members to the advancing material, such as a potato, which is being cut. The cutting blades may be removed in sets from their respective sides of the frame, in the same manner described in conjunction with the form of device shown in Fig. 9.

It will be observed that the cutting head 114 (Fig. 12) when used with a frame such as shown in Fig. 10, will have the right-hand cutters 96', 96'' interfitting with the deeper channels 116 so as to permit the registration or interfitting of the cutters 95, 95' on the opposite side of the frame in the shallower channels 117, this interfitted or registered condition of the cutting head and cutting members of the cutting frame corresponding to the final relationship of these cutting parts at the end of the cutting stroke.

Operation

It will be apparent that the particular construction of the housing, driving, and mounting means for the cutting elements facilitate the manufacture and assembly of the mechanism, and provide for a minimum number of parts which are in themselves simple and suited to rugged construction. For example, the two complementary halves of the housing structure 14 and 16, may be joined together by bolts 18, including therebetween a rack and pinion bracket 74 and its mounting bolts 76, the operating crank 82 and its spindle 80 being readily applied to the bracket 74 with the pinion 80 suitably keyed to the spindle and the return spring 84 thereafter secured to the bracket.

In this assembled relation with or without the cover plate 28 of Fig. 1, one of the cutting frames 70' with its cutting blades 96', 96'', may be inserted into the open end 22 of the housing, with the lowermost corner portions 46 of the frame resting against the seating flanges 44 and with back vertical portions of the frame bearing against the vertical flanges 50 and 52, with the uppermost corner portions of the frame bearing against the upper horizontally seating flanges 54, 56, whereupon the set screw 60 may be turned down to clamp the frame 70' securely in the open end wall 22 of the housing.

Each of the cutting heads or dies 110, 114 is provided with a flange 111 or 113 extended normally to the rear surface thereof, co-extensively with an adjoining side wall thereof, this flange being adapted to overlie the top edge 67 of a driving head 68 (Fig. 1) and to be secured to the latter by means of a set screw 118 insertible through a slot 109 in the flange 113 and threaded into the top wall portion 67 of the driving head.

By manipulation of the handle 82 in a clockwise direction as seen in Fig. 2, the pinion 84 will be correspondingly rotated with the spindle 80 to slide the rack 88 over rollers 92 and thus urge the driving head 68 slidably along the track flanges 46, 48 toward the cutting frame 70'. If a potato or the like has been previously inserted into the open part of the housing, through the top 24 to rest upon the table formed by the co-extensive flanges 40, 42, the potato will be driven by the advancing driving head 68 and cutting head or die 114 against the cutting members 96', 96'' in the frame 70', and therebeyond to issue through the open end wall 22 of the housing and descend over the chute 65. At the end of the driving stroke the several bosses 115 of the cutting head 114 will be interfitted between the latticed blades 96', 96'', so that the last shreds of the potato or other related substance will be expelled from between the blades.

At this juncture the driving head and cutting die carried thereby are in condition to be returned to initial position, the coil spring 84 having been wound or tensioned by the advancing movement of the spindle 80, so that a relatively slight anticlockwise impetus may be given the handle 82 and the driving head 68 and its driving rack 88 will be quickly "kicked" back to its initial position, it being unnecessary for the operator to turn the crank through the entire cycle back to such position as the spring 84 is adapted to effect the return of the rack after the application of a starting motion to the spindle.

If it is desired to apply a coarser cut to the potato, a frame such as that shown in Fig. 3 with the more widely spaced cutters 96, may be substituted for the frame shown in Fig. 1 by a manipulation of the set screw 60, as heretofore described, and the corresponding cutting head 110, such as shown in Fig. 4, may replace the cutting head 114 by loosening of the set screws 115 and simply sliding the replacement head 110 into place and resetting the set screw, the operation of the mechanism being otherwise the same as that already described, regardless which of the several frames or cutting heads is used.

If it is desired to replace or clean the cutting blades, the latter may be removed in sets from their frames very simply by withdrawing the two locking pins 103 at opposite sides of the frame (Fig. 9), and thereafter grasping the lowermost blades conveniently and lifting the entire set out of the frame, the interfitted or latticed relationship of the blade assembly being undisturbed for the reason that the horizontal blades (referring still to Fig. 9) are strung upon the pins 102, which pins are readily removed from the open slots 104, while the vertically disposed blades being interfitted with the horizontal blades by means of the several notches 97 will prevent any relative displacement of the several blades.

In the removal of blades from the fine cut or double blade frame assembly, such as shown in Fig. 10, the foregoing procedure is simply duplicated on opposite sides of the frame.

While I have described the construction of my improved cutting mechanism in particular detail for purposes of illustration, it will be understood that the structure is susceptible of modification without departure from the spirit of the invention, and I therefore do not wish to be limited to any precise details recited herein but desire to avail myself of all of the modifications, variations, and applications coming within the scope of the appended claims which I desire to protect by Letters Patent of the United States.

I claim:

1. Cutting means for use with vegetable cutters and the like and comprising a frame member having opposite adjoining frame portions with aligned blade receiving slots therein, oppositely disposed frame portions constituting a pair and each frame portion of one said pair being provided with an internal bore extending through its length and transversely through the said slots therein, said frame having a second pair of opposite frame portions adjoining said first-mentioned pair and similarly provided with aligned blade receiving slots, the said frame portions of said second pair having open channels extending substantially through their length transversely across said blade receiving slots therein in such manner that a set of blades having opposite apertured end portions with mounting rods threaded therethrough may be seated in said frame with said mounting rods deposited in said open channels, a second set of said blades being seated in the blade receiving slots in said first-mentioned pair of frame members so as to overlie in crosswise fashion the blade members mounted on pins in said open channels, said second-mentioned set of blades being locked in said frame by means of pin members extended into said internal bore formations and threaded through the apertured end portions of said blades.

2. A cutting frame and blade mounting means therefor including an open frame member of substantially rectangular form having aligned blade mounting slots in opposite frame portions thereof, one pair of opposite frame portions having open channels cutting transversely across the blade slots therein and having a set of blades in the slots therein and strung on elongated pins seated in said channels, there being a second set of blades disposed in the blade slots in an adjoining pair of opposite frame members so as to overlie the first-mentioned set of blades in a crosswise sense, the end portions of the blades of said second set having apertured portions in said slots, and the corresponding frame members having an internal bore and elongated pin means inserted therein threadably through the aforesaid apertured portions in the blades of said second set, whereby the latter set of blades will hold the blades of the first-mentioned set in said frame and form therewith a lattice-like cutting pattern.

3. A device of the class described including a substantially rectangular open frame having opposite frame members constituting pairs and each frame member being provided with open blade receiving slots, each frame member of a particular one of said pairs having an open pin receiving channel cutting transversely across the said slots therein, blade members constituting a first set being disposed in the slots of said particular pair of frame members and strung upon pin members through their respective end portions with the pin members seated in corresponding pin receiving channels, a second set of blades being disposed in the slots in a second pair of frame members adjoining those of said first-mentioned pair and the blades of said second set being strung upon pin means extended internally through corresponding frame members of said second pair and through apertured end portions of the blades seated in the slots thereof, the blades of said second set extending across the blades of said first set to secure the latter in mounted condition.

4. Cutting means for use with potato cutters and comprising a rectangular frame member having a plurality of aligned slots in oppositely disposed sides of the frame, one pair of oppositely disposed frame members having lengthwise pin-receiving channels extending therethrough and opening endwise of the frame and extending transversely of and through the blade slots in their respective said sides of the frame, while the remaining pair of opposite frame sides have similarly disposed blade slots and transverse pin channels which are open throughout their longitudinal extent in the same surface as the slotted surface of their respective corresponding frame sides, whereby a set of blades strung on pins through apertured end portions thereof may be dropped into slots in the said last-mentioned pair of opposite frame members, while a second set of blades may be secured in place to overlie in lattice fashion said first-mentioned set by dropping the blades of the second set into the slots in opposite sides of the frame to those of the first said set, and thereafter inserting locking pins into the end of the frame and through the apertured ends of the blades disposed in said last-mentioned slots.

SAMUEL BLOOMFIELD.